Patented Sept. 17, 1935

2,015,039

UNITED STATES PATENT OFFICE 2,015,039

PREPARATION OF PHENYLMETHANES

Ernest F. Pevere, Beacon, N. Y., assignor to The Texas Company, New York, N. Y., a corporation of Delaware No Drawing. Application July 19, 1933, Serial No. 681,129

9 Claims. (Cl. 260—64)

This invention relates to the preparation of phenylmethanes and specifically to the preparation of amino-substituted phenylmethanes.

I have found that amino-substituted phenylmethanes, particularly those containing more than one aminophenyl radical, may be produced in a simple and efficient manner by reacting a methylene ether with an arylamine in the presence of heat. It is preferable to use for this purpose a methylene ether containing more than one alkoxy group, and by proceeding in this way the alkoxy group may be readily replaced by an aminophenyl group with the liberation of alcohol. The reaction may be further illustrated by the following equation for the preparation of diaminodiphenylmethane:

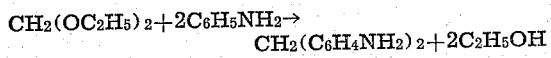
$$CH_2(OC_2H_5)_2 + 2C_6H_5NH_2 \rightarrow CH_2(C_6H_4NH_2)_2 + 2C_2H_5OH$$

It is advantageous, in order to make the reaction proceed smoothly and go to completion, that the alcohol be removed, say by distillation, as the reaction proceeds.

I have succeeded in preparing amino-substituted phenylmethanes of high yield and good purity which may be used in the manufacture of dyes without extensive purification, although crystallization from a suitable solvent, such as ether, may be used. By careful addition of the reagents and removal of the alcohol the process may be carried out in a continuous manner.

The following example will serve to give a better understanding of the invention: A still connected with a fractionating column and containing ethyl-orthoformate was heated so that the liquids therein were maintained at about 150° C. Aniline was slowly added to the still at such a rate that the temperature at the top of the column did not rise above 80° C. The vapors from the fractionating column were condensed to form a distillate consisting essentially of alcohol. The residue, which on cooling crystallized, consisted principally of p-leucaniline.

Diaminodiphenylmethane may be prepared in a similar manner by using, instead of ethyl-orthoformate, methylene-diethyl ether. In the latter case it is necessary to have efficient fractionation in order to separate the alcohol from the ether due to the close boiling points of the two.

While I have specified aniline as the arylamine, it is to be understood that I may use substituted anilines or other arylamines.

Obviously many modifications and variations of the invention, as hereinbefore set forth, may be made without departing from the spirit and scope thereof, and therefore only such limitations should be imposed as are indicated in the appended claims.

I claim:

1. The method of preparing phenylmethane derivatives which comprises reacting a methylene ether with an amino substituted benzene.

2. The method of preparing p-aminophenylmethanes which comprises reacting a methylene ethyl ether containing more than one ethylate radical with aniline.

3. The method of preparing p-aminophenylmethanes which comprises reacting a methylene ethyl ether containing more than one ethylate radical with aniline while removing alcohols evolved in the reaction.

4. The method according to claim 3 in which the temperatures are about 140°—150° C.

5. The method of preparing p-aminophenylmethanes which comprises contacting aniline with a methylene ethyl ether containing more than one ethylate radical at reaction temperatures while removing alcohols evolved in the reaction and then separating the p-aminophenylmethane so formed from the products of reaction.

6. The method of preparing p-aminophenylmethanes which comprises heating to a temperature, sufficient to effect reaction, a methylene ethyl ether containing more than one ethylate radical with aniline, removing the alcohol formed in the reaction, cooling the residual product, and recrystallizing the resultant solids from ether.

7. The method of preparing p-leucaniline which comprises reacting ethyl-orthoformate with aniline.

8. The method of preparing diaminodiphenylmethane which comprises reacting methylene diethyl ether with aniline.

9. The method of preparing amino derivatives of phenylmethanes which comprises reacting a methylene ether containing more than one alkoxy group with a phenylamine in the presence of heat.

ERNEST F. PEVERE.